Figure 1:
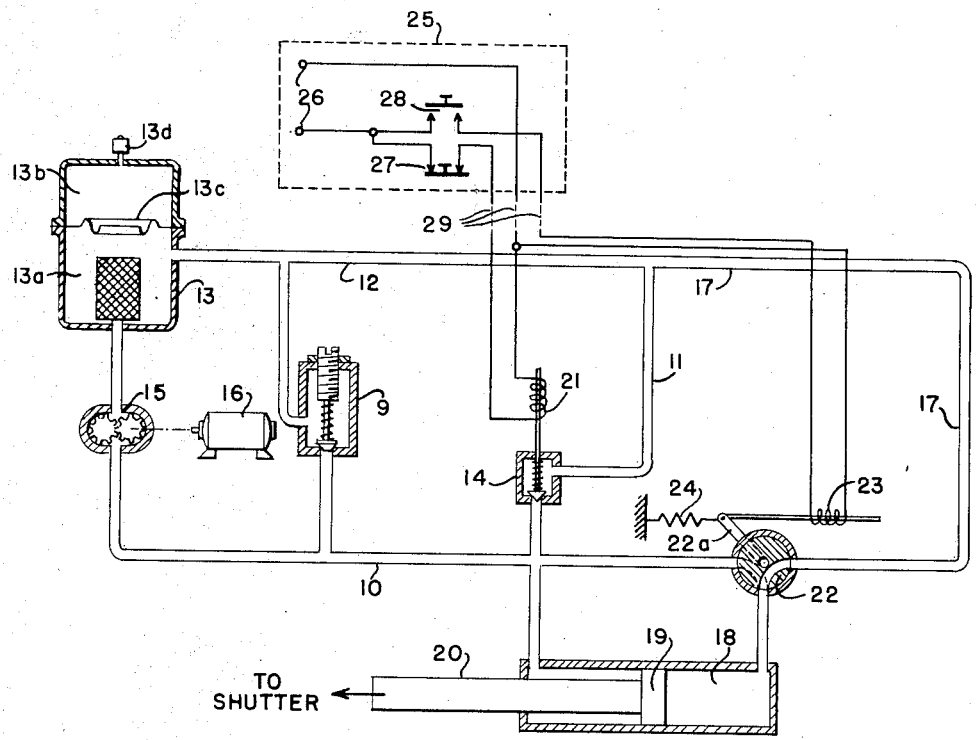

Jan. 11, 1955     I. W. DOYLE ET AL     2,699,102

FLUID SHUTTER-OPERATING SYSTEM FOR CAMERAS

Filed March 19, 1952     2 Sheets-Sheet 1

*INVENTORS*
IRVING W. DOYLE
NELSON KLING

BY *Lawrence B Dodds*

ATTORNEY

Jan. 11, 1955  I. W. DOYLE ET AL  2,699,102
FLUID SHUTTER-OPERATING SYSTEM FOR CAMERAS
Filed March 19, 1952  2 Sheets-Sheet 2

INVENTORS
IRVING W. DOYLE
NELSON KLING
BY
*Laurence B. Dodds*
ATTORNEY

United States Patent Office 2,699,102
Patented Jan. 11, 1955

2,699,102

FLUID SHUTTER-OPERATING SYSTEM FOR CAMERAS

Irving W. Doyle, Massapequa, and Nelson Kling, Roslyn, N. Y., assignors to Fairchild Camera and Instrument Corporation, a corporation of Delaware Application March 19, 1952, Serial No. 277,464

9 Claims. (Cl. 95—57)

This invention relates to fluid shutter-operating systems for cameras and, while it is of general application, it is particularly applicable to the remote actuation of the shutter of a focal plane camera and it will be specifically described in such an application.

In certain cameras, such as aerial cameras, it is desirable to control the actuation of the shutter from a remote point. Systems heretofore proposed for such remote shutter actuation have utilized mechanical or electromechanical actuating mechanisms which, for adequate shutter speeds, have involved high rates of acceleration and deceleration and consequently have developed large forces and stresses in the mechanisms, resulting in excessive wear. This has been particularly true of focal plane cameras in which the moving parts have substantial inertia so that the reaction forces of the shutter mechanism to acceleration and deceleration are relatively large. Further, in order to provide a fast shutter movement, such mechanisms have generally required that at least a portion of the acceleration and deceleration take place during the exposure movement of the shutter so that the shutter speed is not uniform during exposure and the film is not uniformly exposed.

It is an object of the present invention, therefore, to provide a new and improved fluid shutter-operating system for cameras which obviates the above-mentioned disadvantages of prior shutter-operating systems.

It is another object of the invention to provide a new and improved fluid shutter-operating system for cameras which realizes one or more of the following advantageous characteristics: moderate acceleration and deceleration of the moving parts, decreasing wear and tear and increasing the service life of the camera; uniform shutter speed during exposure with no susbtantial acceleration or decelation during this period; reversible operation of the shutter, thereby avoiding capping of the shutter during a reverse movement; uniform speed of the shutter slit in both directions of operation, ensuring uniform exposure of the film during successive exposures; utilization of the momentum of at least a portion of the actuating mechanism to initiate operation of the shutter, thereby increasing the available speed of shutter operation.

In accordance with the invention, in a camera including a focal-plane shutter, a fluid shutter-operating system comprises a closed fluid circulation path, means for establishing a continuous fluid flow through the fluid path, a fluid by-pass around a portion of the fluid path including a fluid-actuated shutter-operating mechanism, and means for utilizing the momentum of the continuously operating fluid-flow means to impart initial rapid acceleration to the shutter comprising valve mechanism for selectively diverting the fluid flow through the by-pass to actuate the shutter.

Further in accordance with the invention, in a focal plane shutter, a reversible fluid-actuated shutter-operating mechanism comprises a double-acting cylinder and piston, the piston having an effective area on one side susbtantially twice that on the other side, a system for supplying fluid under pressure, and a selector valve mechanism for selectively admitting fluid from the system to the side of the piston of lesser area for operation of a shutter in one direction and for admitting fluid to both sides of the piston for operation of the shutter in the other direction with substantially equal force.

For a better understanding of the present invention, together with other and further objects thereof, reference is had to the following description taken in connection with the accompanying drawings, while its scope will be pointed out in the appended claims.

Figure 4:
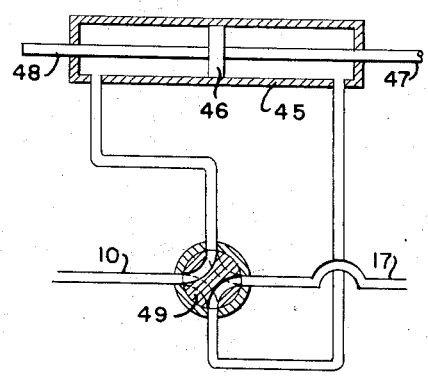
Figure 2:
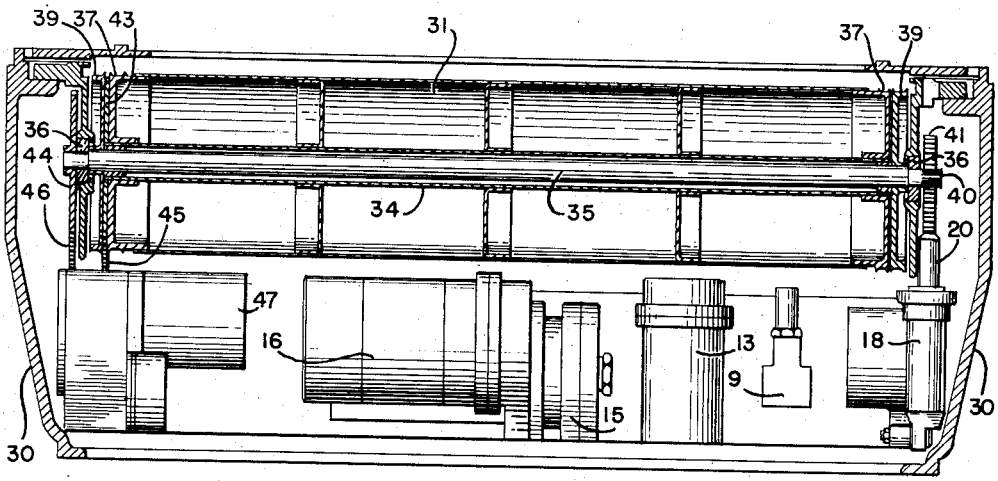
Figure 3:
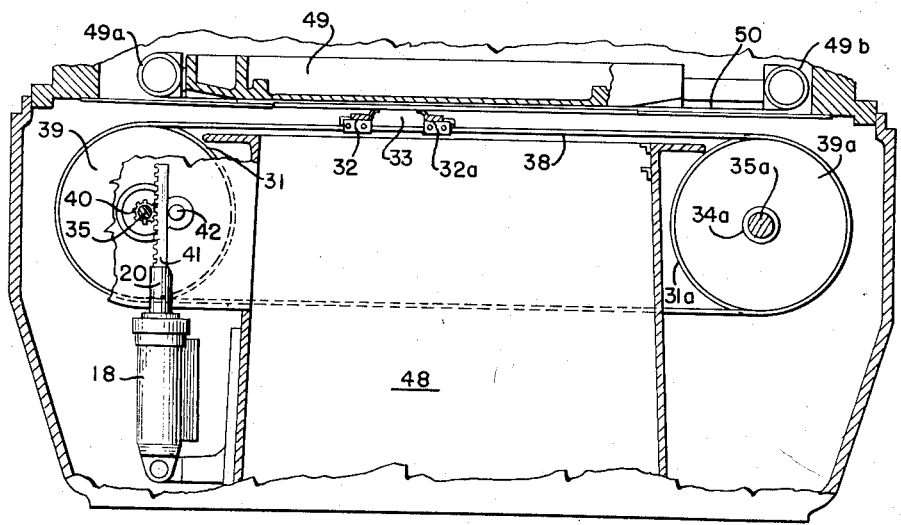
Figure 3A:
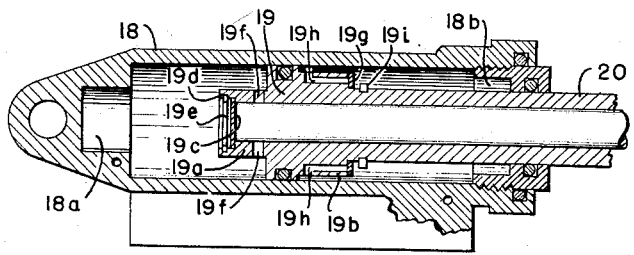

Referring now to the drawings, Fig. 1 is a schematic representation of a fluid shutter-operating system for cameras embodying the invention; Fig. 2 is a longitudinal elevation, partly in section, of one embodiment of the shutter-operating system of Fig. 1; Fig. 3 is a cross-sectional view of the apparatus of Fig. 2; Fig. 3a is a cross-sectional detail of the piston and cylinder mechanism of Figs. 2 and 3; while Fig. 4 is a schematic representation of a modified form of shutter-actuating mechanism suitable for use in the system of Fig. 1.

Referring now to Fig. 1 of the drawings, there is represented a fluid shutter-operating system for actuating the shutter of a focal plane camera. This system comprises a closed fluid circulation path including the conduits 10, 11, and 12 and a reservoir 13 from which fluid is withdrawn for circulation through the path and to which it is returned. The reservoir includes a fluid chamber 13a sealed from an air chamber 13b by a flexible diaphragm 13c. An air vent 13d is provided for chamber 13b. The conduit 11 includes a shut-off or on-off valve 14. The system also includes means, such as a continuously operating pump 15 driven by a motor 16, for establishing a continuous fluid flow under pressure through the path 10, 11, 12 from the reservoir and returning it thereto. The motor and pump unit 15, 16 preferably is of the type delivering fluid at constant pressure.

The system also includes a fluid by-pass conduit 17 around a portion of the path, specifically around the conduit 11 including the shut-off valve 14. The fluid by-pass 17 includes a double-acting reversible fluid-actuated shutter-operating mechanism. This mechanism is illustrated in the form of a double-acting cylinder 18 and piston 19, the piston 19 having a connecting piston rod 20, the area of the rod 20 being such that the effective area of the piston 19 on the side opposite the rod 20 is substantially twice that of the other side.

There is provided a solenoid operating mechanism 21 for the shut-off valve 14 and these units comprise valve mechanism for selectively diverting the fluid flow from the path 10, 11, 12 through the by-pass 17 to the cylinder and piston 18, 19 to actuate the shutter. There is also provided a selector valve mechanism for controlling admission of the fluid to the operating mechanism 18, 19 selectively to determine the direction of operation of the shutter. This selector valve mechanism may take the form of a two-way selector valve 22 which, in the position illustrated, is such that the fluid is admitted to the side of the piston 19 of lesser area for operation of the shutter in the right-hand direction, the fluid in the right-hand portion of the cylinder 18 being wasted through the valve 22 and returned to the reservoir. The valve 22 when adjusted to the position indicated in dotted lines is effective to admit fluid to both sides of the piston 19 for operating the shutter in the opposite direction with substantially equal force. The selector valve 22 is provided with a solenoid operating device 23 connected to actuate a crank 22a of the valve 22, the valve being normally biased into the position illustrated by a spring 24. A high-pressure relief valve 9 of conventional construction is connected in parallel with the shut-off valve 14.

The system also includes a remote control circuit for selectively controlling the energization of the solenoid devices 21 and 23. This control circuit includes a control station 25 including a pair of supply circuit terminals 26 which are connected to energize the solenoid device 21 through a normally closed push-button switch 27 and to energize the solenoid device 23 through a normally open push-button switch 28. By using a common conductor for one connection to each of the devices 21, 23, only three conductors, illustrated as the dotted-line conductors 29, need extend from the control station 25 to the camera.

Referring now to Figs. 2 and 3 of the drawings, there is represented an application of the system of Fig. 1 for operating a focal plane camera shutter of the type described and claimed in the copending application of Irving W. Doyle and Alfred G. Nash, Serial No. 267,352, filed January 21, 1952, and entitled "Focal Plane Camera Shutter." Corresponding elements of the system of Fig. 1 and Figs. 2 and 3 are identified by the same reference numerals. The shutter and the shutter-operating system of Fig. 1 are enclosed in a portion 30 of the camera housing. Disposed in the housing are a pair of curtain rollers 31 and 31a between which extend a pair of curtains (not shown) terminating at a pair of transverse bars 32, 32a, respectively, forming the shutter slit 33.

Each of the rollers 31a, 31a is effective to store its respective curtain as the slit bars move toward it and feed it out when the slit bars move in the opposite direction. Rollers 31, 31a comprise sleeves 34, 34a, respectively, journalled on shafts 35, 35a, respectively, disposed in suitable fixed bearings such as the bearings 36, 36 of shaft 35. Secured to the ends of rollers 31, 31a are pulleys, such as the pulleys 37, 37 of roller 31, while an endless belt, such as the belt 38, extends around and between each corresponding pair of pulleys of the rollers 31, 31a. These belts are secured to opposite ends of one of the slit bars, such as the bar 32. Secured to opposite ends of the shaft 35 are a pair of pulleys 39, 39, while similar pulleys, such as the pulley 39a, are secured to opposite ends of the shaft 35a. A second pair of endless belts similar to the belt 38 individually extend around and between corresponding pairs of pulleys 39, 39a and are secured to opposite ends of the other slit bar 32a.

On one end of shaft 35 is a pinion 40, while the piston rod 20 has an extending rack 41 co-operating with the pinion 40 and maintained in engagement therewith by an idler roller 42. Disposed at the end of sleeve 34 is a pinion 43, while at the corresponding end of shaft 35 is a pinion 44. The pinions 43 and 44 engage with pinions 45 and 46, respectively, of a differential mechanism 47 or equivalent. Thus, the piston rod 20 and rack 41 actuate the shaft 35 and the pulleys 39, 39a which drive the endless belts connected to the shutter slit bar 32a. Simultaneously through the gearing 44, 46 and the gearing 43, 45 of the differential mechanism, the sleeves 34, 34a are driven and they, in turn, drive the rollers 31, 31a, respectively. The belts disposed on the roller pulleys, such as the pulleys 37, drive the other slit bar 32 in unison with the slit bar 32a to effect a camera exposure. By operating the ring gear or equivalent of the differential mechanism 47, the angular relation of the pulleys 37 and 39 may be adjusted to adjust the spacing of the slit bars 32, 32a and thus the width of the shutter slit. It will be understood that the shutter elements and the slit-adjusting mechanism comprising elements 31–47, inclusive, may be of any suitable construction, for example, as described and claimed in aforesaid copending application of Doyle and Nash, and comprise no part of the present invention; therefore, the details of construction of these elements are not shown.

The shutter slit 34 passes over the open end of the camera aperture 48, while immediately adjacent thereto is disposed a film magazine 49, a fragmentary portion of which is shown in Fig. 3, having film-feed and take-up spools 49a and 49b around which passes the film 50 closely adjacent the shutter slit 33.

In order to limit the deceleration at the end of each stroke of the piston 19, the cylinder 18 is provided with recesses 18a at one end and 18b at the other end, as shown in Fig. 3a, while the piston 19 is provided with projections 19a at one end and 19b at the other end proportioned to fit loosely in the cylinder recesses 18a and 18b, respectively. By appropriately proportioning these piston projections and cylinder recesses, there is provided a dash-pot effect at each end of the piston stroke, limiting the deceleration of the piston and cushioning the actuating mechanism against the shock of sudden stops at the ends of the piston strokes. By giving these piston projections and cylinder recesses proper configurations, the deceleration of the piston at each end of the stroke may be made substantially uniform. In order to avoid any limitation on the acceleration of the piston 19 during the beginning of its stroke in either direction, there is provided a check valve at either end of the piston which opens to admit fluid behind the piston projection at such portion of the stroke. Thus the projection 19a is provided with a disc check valve 19c freely movable in a recess 19d and held in place by a snap ring 19e. The internal bore of the piston 19 is ported to the cylinder by apertures 19f, 19f. Similarly, the piston projection 19b is provided with an annular check valve 19g which normally closes ports 19h, 19h opening into the cylinder beyond the recess 18a. A snap ring 19i fitted on the piston rod 20 retains the check valve 19g in place.

It is believed that the operation of the fluid shutter-operating system of the invention will be clear from the foregoing description. In brief, referring particularly to Fig. 1 and assuming that the elements are in the positions illustrated, the solenoid mechanism 21 of the shut-off valve 14 is energized through the normally closed switch 27, while the solenoid device 23 of the selector valve 22 is de-energized at the normally open push-button switch 28. Therefore, the shut-off valve 14 is open and the fluid from the continuously driven fluid pump 15 circulates idly through the conduits 10, 11, 12 in that order. If now it is desired to actuate the camera shutter in a direction corresponding to the movement of the piston 19 to the right, the push-button switch 27 is opened to de-energize the solenoid device 21, thereby closing the shut-off valve 14. The fluid is now forced into the left-hand portion of the cylinder 18, actuating the piston 19 and the piston rod 20 to the right and operating the shutter slit 33 of Fig. 3 in a corresponding direction. Fluid in the right-hand portion of cylinder 18 is wasted through the valve 22 and returned to the reservoir 13.

By virtue of the fact that the motor 16 and the pump 15 operate continuously, the momentum of these moving parts, as well as the momentum of the fluid in motion in the fluid circulation path, are effective to impart an initial maximum acceleration to the shutter-actuating mechanism 18, 19, 20 so that it reaches its final velocity in an extremely short travel and by the time the shutter slit 33 reaches one edge of the camera aperture 48. The actuating mechanism 18, 19, 20 then continues to drive the shutter slit 33 at uniform velocity across the camera aperture until it reaches its limit of travel on the other side, completing an exposure of the film. The push-button switch 27 is then released, energizing solenoid 21 to open valve 14 to divert fluid from the actuating mechanism 18, 19, 20 and the shutter-operating system is ready for a successive exposure. If desired, limit switches (not shown) responsive to the movement of the shutter slit 33 to its extreme positions may be provided for automatically energizing the solenoid device 21 to remove fluid pressure from the piston 19.

When it is desired to take a successive exposure, the push-button switch 28 is closed to energize the solenoid device 23 and actuate the selector valve 22 in a clockwise direction, making the fluid connection indicated in dotted lines in Fig. 1, and the push-button switch 27 is simultaneously opened to de-energize the solenoid device 21 to close the shut-off valve 14. Under these conditions, high pressure fluid is admitted simultaneously to both ends of the cylinder 18 but, by virtue of the fact that the effective area of the right-hand side of piston 19 is twice that of the left-hand area, the net force on the piston drives it to the left, operating the shutter slit 33 in a direction opposite to that described above and with equal force. In this case the fluid circulates from the left-hand portion to the right-hand portion of cylinder 18, the reservoir 13 supplying the difference due to the larger volume of the right-hand portion of the cylinder.

Thus it is seen that the fluid shutter-operating system of the invention is one which realizes the desired advantages, namely, moderate acceleration and deceleration of the moving parts, decreasing wear and tear and increasing service life. By use of the momentum of the continuously operating parts and the circulating fluid to initiate shutter operation, the fluid pressure increases to a high value and the shutter is rapidly accelerated to its final velocity in a very short time and before the slit reaches the aperture to initiate an exposure. By the time the slit reaches the aperture and is moving at its full speed, the load of the shutter is reduced to a low value and there is an increased fluid flow at low pressure. This permits an extremely fast shutter operation and avoids acceleration or deceleration of the shutter slit during exposure, thus providing an extremely uniform shutter speed during exposure.

Referring now to Fig. 4, there is a schematic representation of a modified form of the invention in which the cylinder 18 and piston 19 with a single-ended piston rod 20 are replaced by a cylinder 45 and piston 46 with piston rods 47 and 48 extending through both ends of the cylinder so that the effective area of the piston 46 is the same for both directions of operation. With this arrangement, the two-way selector valve 22 of the system of Fig. 1 is replaced by a four-way selector valve 49 which is effective to connect either side of the cylinder 45 to the supply conduit 10 and the other side thereof to the waste conduit 17. The operation of the actuating mechanism of Fig. 4 is otherwise similar to that described above.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a camera including a focal-plane shutter, a fluid shutter-operating system comprising: a closed fluid circulation path; means for establishing a continuous fluid flow through said path; a fluid by-pass around a portion of said path including a fluid-actuated shutter-operating mechanism; and means for utilizing the momentum of said continuously operating fluid-flow means to impart initial rapid acceleration to said shutter comprising valve mechanism for selectively diverting the fluid flow through said by-pass to actuate said shutter.

2. In a camera including a focal-plane shutter, a fluid shutter-operating system comprising: a closed fluid circulation path including a reservoir; means for establishing a continuous fluid flow through said path from said reservoir and returning thereto; a fluid by-pass around a portion of said path including a fluid-actuated shutter-operating mechanism; and means for utilizing the momentum of said continuously operating fluid-flow means to impart initial rapid acceleration to said shutter comprising valve mechanism for selectively diverting the fluid flow through said by-pass to actuate said shutter.

3. In a camera including a focal-plane shutter, a fluid shutter-operating system comprising: a closed fluid circulation path; a continuously operating motor-driven pump for establishing a continuous fluid flow through said path; a fluid by-pass around a portion of said path including a fluid-actuated shutter-operating mechanism; and means for utilizing the momentum of said continuously operating fluid-flow means to impart initial rapid acceleration to said shutter comprising valve mechanism for selectively diverting the fluid flow through said by-pass to actuate said shutter.

4. In a camera including a focal-plane shutter, a fluid shutter-operating system comprising: a closed fluid circulation path including a shut-off valve; means for establishing a continuous fluid flow through said path; a fluid by-pass around said shut-off valve including a fluid-actuated shutter-operating mechanism; and means for utilizing the momentum of said continuously operating fluid-flow means to impart initial rapid acceleration to said shutter comprising an actuating mechanism for said shut-off valve selectively to divert the fluid flow through said by-pass to actuate said shutter.

5. In a camera including a focal-plane shutter, a fluid shutter-operating system comprising: a closed fluid circulation path; means for establishing a continuous fluid flow through said path; a fluid by-pass around a portion of said path including a double-acting fluid-actuated shutter-operating mechanism; means for utilizing the momentum of said continuously operating fluid-flow means to impart initial rapid acceleration to said shutter comprising valve mechanism for selectively diverting the fluid flow through said by-pass to actuate said shutter; and a selector valve mechanism for controlling admission of fluid to said operating mechanism selectively to determine the direction of operation of said shutter.

6. In a camera including a focal-plane shutter, a fluid shutter-operating system comprising: a closed fluid circulation path; means for establishing a continuous fluid flow through said path; a fluid by-pass around a portion of said path including a fluid-actuated shutter-operating mechanism; means for utilizing the momentum of said continuously operating fluid-flow means to impart initial rapid acceleration to said shutter comprising valve mechanism for selectively diverting the fluid flow through said by-pass to actuate said shutter; and means for cushioning said shutter-operating mechanism to a stop as it approaches its limit of travel.

7. In a camera including a focal-plane shutter, a fluid shutter-operating system comprising: a closed fluid circulation path; means for establishing a continuous fluid flow through said path; a fluid by-pass around a portion of said path including a cylinder and piston shutter-operating mechanism; means for utilizing the momentum of said continuously operating fluid-flow means to impart initial rapid acceleration to said shutter comprising valve mechanism for selectively diverting the fluid flow through said by-pass to actuate said shutter; and an auxiliary piston and loosely fitting cylinder for cushioning said shutter-operating mechanism to a stop as it approaches its limit of travel.

8. In a camera including a focal-plane shutter, a fluid shutter-operating system comprising: a closed fluid circulation path; means for establishing a continuous fluid flow through said path; a fluid by-pass around a portion of said path including a double-acting fluid-actuated shutter-operating mechanism; means for utilizing the momentum of said continuously operating fluid-flow means to impart initial rapid acceleration to said shutter comprising valve mechanism for selectively diverting the fluid flow through said by-pass to actuate said shutter; a selector valve mechanism for controlling admission of fluid to said operating mechanism selectively to determine the direction of operation of said shutter; solenoid operating devices for said valve mechanism; and a remote control circuit for selectively controlling the energization of said solenoid devices.

9. In a camera including a focal-plane shutter, a fluid shutter-operating system comprising: a closed fluid circulation path; means for establishing a continuous fluid flow through said path; a fluid by-pass around a portion of said path including a reversible fluid-actuated shutter-operating mechanism, said shutter-operating mechanism comprising a double-acting cylinder and piston, said piston having an effective area on one side substantially twice that on the other side; means for utilizing the momentum of said continuously operating fluid-flow means to impart initial rapid acceleration to said shutter comprising valve mechanism for selectively diverting the fluid flow through said by-pass to actuate said shutter; and a selector valve mechanism for selectively admitting fluid to the side of said piston of lesser area for operating a shutter in one direction and for admitting fluid to both sides of said piston for operating said shutter in the other direction with substantially equal force.

References Cited in the file of this patent

UNITED STATES PATENTS

| 530,486 | Jensen | Dec. 4, 1894 |
| 1,764,066 | Chamberlin | June 17, 1930 |
| 2,321,361 | Chappell et al. | June 8, 1943 |
| 2,331,026 | Harrington | Oct. 5, 1943 |
| 2,475,304 | Bariffi | July 5, 1949 |